F. MAJOR.
VEHICLE SIGNAL.
APPLICATION FILED APR. 5, 1921.
1,437,533.
Patented Dec. 5, 1922.
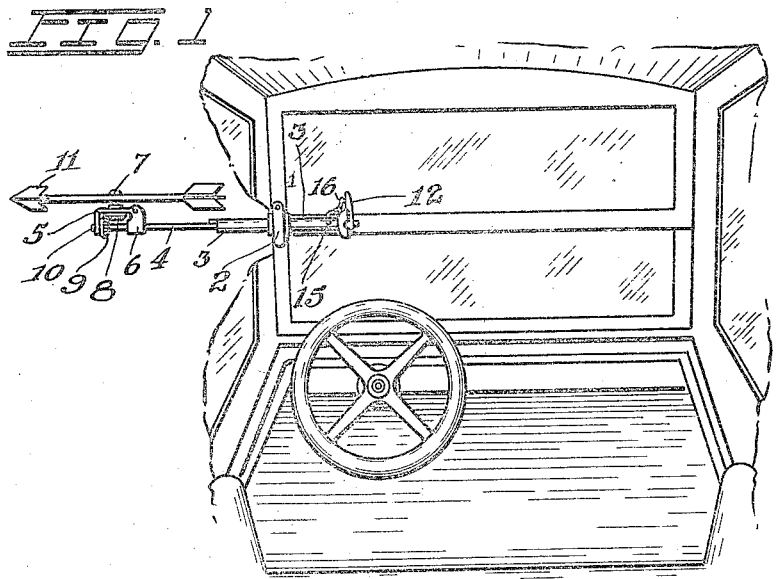
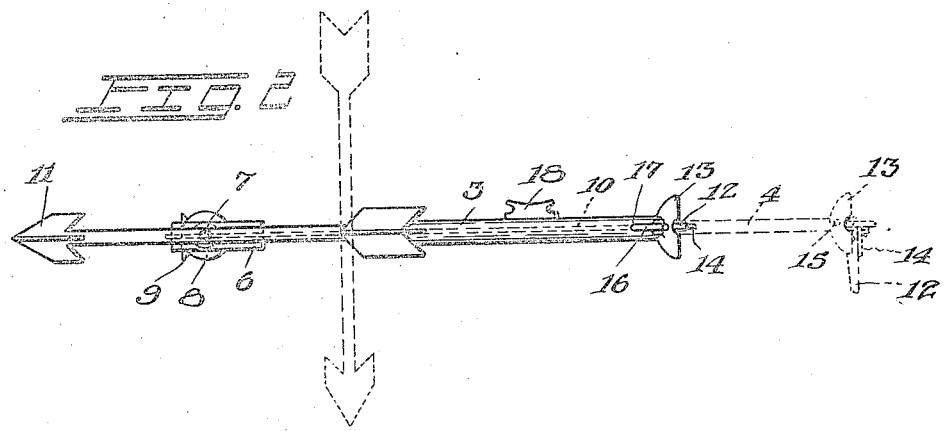
INVENTOR
Frank Major
ATTORNEY Patented Dec. 5, 1922.

1,437,533

UNITED STATES PATENT OFFICE.

FRANK MAJOR, OF EARLINGTON, WASHINGTON.

VEHICLE SIGNAL.

Application filed April 5, 1921. Serial No. 458,794.

*To all whom it may concern:*

Be it known that I, FRANK MAJOR, a citizen of the United States, residing at Earlington, in the county of King and State of Washington, have invented certain new and useful Improvements in Vehicle Signals; and I do hereby declare the following to be a full, clear, and exact description of the invention, such as will enable others skilled in the art to which it appertains to make and use the same.

This invention relates to new and useful improvements in vehicle signals and particularly to a mechanical signal with an indicator such as an arrow or the like arranged upon a pivot that can be turned in various directions by the driver of the vehicle to signify as to his intentions of turning out or stopping.

The main object of this invention is to provide a signal which can be readily attached to the vehicle near the position of the driver to be operated by the driver and to have an arrow or other well known device for turning in the desired direction to indicate to following drivers when the advanced vehicle is about to change its course.

Another object of the invention is the provision of a simple and yet efficient signal which can be constructed so cheaply that all users of automobiles can afford to purchase the same and so provide a universal signal for all vehicles to be understood by all drivers.

With the above and other objects in view the invention consists in the novel features of construction, combination and arrangement of parts hereinafter more fully set forth, pointed out in the claims and shown in the accompanying drawings in which:

Figure 1 is a detail perspective looking toward the front of a motor vehicle illustrating the signalling device as attached to the side and top portion of the vehicle windshield;

Fig. 2 is a top plan view of the signal used upon the side;

Referring now more particularly to the drawings the base numeral 1 indicates the frame portion of a vehicle windshield to which is attached a clamping member 2 supporting a tubular member 3. Slidably mounted within this tubular member 3 is a tube 4 having mounted upon its outer end a bracket 5, said bracket being substantially U-shaped and provided with an enlarged bearing member 6 at its inner end. The longitudinal portion of the bracket 5 is provided with a pivot pin 7 and mounted upon the pin between the arms of the bracket is a gear 8 adapted to mesh with a similar gear 9 which is mounted upon a rod 10 sliding within the tube 4. From this it will be apparent that upon rotation of the rod 10, movement will be imparted to the gear 8 to rotate the pin 7.

Mounted upon this pin 7 and adapted to rotate therewith is an indicating member 11 which is shown herein as in the form of an arrow, although it will be understood that various other types of indicators can be used. Connected to the outer end of the rod 10 is a latch member 12 normally pressed into engagement with the latch plate 13 mounted upon tube 4, by means of a spring member 14. The latch plate 13 is provided with notches 15 for engagement by the latch 12 so that the rod 10 can be readily rotated within the tube 4 and the latch member 12 engaged with the notches 15 to retain the arrow in various indicated positions.

Pivotally connected to the inner face of the latch plate 13 is a spring pressed catch member 16 which is adapted to engage within openings 17 formed in the tube 3 so that when the tube 4 is moved to its normal position within the tube 3 as illustrated in Fig. 1, the pivoted catch member 16 engages one of these openings and retains the tube 4 against movement. From this it will be apparent that should it be desired to rotate the tube 4 so as to dispose the bracket member 5 and the indicating arrow 11 at right angles to the position shown in Fig. 1, the latch member 16 is disengaged from the opening 17 and tube 4 rotated within the tube 3 so that upon rotation of the rod 10, the arrow may be readily disposed into vertical position indicating to the following vehicles that the driver in the advanced vehicle desired to stop. In the same manner tube 4 may be moved longitudinally within tube 3.

In Fig. 1 I have illustrated the device in such a position as to indicate to the following driver that the advanced vehicle desires to turn to the left and it will be readily apparent from the above description that the indicating member 11 can be quickly and readily adjusted to indicate the various directions, in which the vehicle desires to proceed. In Fig. 2 I have illustrated a lug 18 attached to the side of the tubular member 3 in order to space the tubular member from the vehicle to permit the turning movement of the tube 4 by grasping the latch 12.

Fig. 2 further illustrates how, by sliding and rotating tube 4, respectively, in tubular support or base 3, the arrow may be moved in or out with respect to the car and swung so as to rotate on a horizontal axis rather than on a vertical axis as illustrated in Fig. 1.

From the above description taken in connection with the accompanying drawings, it will be readily apparent that I have provided a simple and durable vehicle signal which can be manufactured at comparatively low cost, can be quickly and readily applied to any well known make of vehicle and is so arranged with respect to the position of the driver, that it can be readily operated by the driver to indicate the direction in which they desire to proceed or whether a stop is contemplated.

I claim:

1. In a signal for vehicles, a tubular supporting base, an auxiliary tube slidably and rotatably mounted within the support, an operating rod mounted within the auxiliary tube for rotary movement, means for securing the auxiliary tube in the desired position relative the base, means for holding the rod in various positions in the auxiliary tube, an indicator pivotally supported from the auxiliary tube, and means connecting the rod and the indicator for transmitting rotary motion thereto.

2. A signal for vehicles comprising a tubular support, a tubular member slidable and rotatable in said support, means for interlocking the tubular member in desired positions relative the support, a bracket carried by one end of the tubular member, an indicator having a spindle journaled in said bracket perpendicular to the tubular member, a rod rotatably mounted in the tubular member and intermeshing gears carried by said rod and spindle whereby rotary movement of the rod is transmitted to the indicator.

In testimony whereof I affix my signature.

FRANK MAJOR.